United States Patent
Liu et al.

(10) Patent No.: US 8,340,705 B2
(45) Date of Patent: Dec. 25, 2012

(54) METHOD OF CAMPING ON A HYBRID CELL AND CHECKING ACCESS PRIORITY AND DEVICE THEREFOR

(75) Inventors: Liu Liu, Beijing (CN); Xiaoming She, Beijing (CN); Lan Chen, Beijing (CN); Yixue Lei, Beijing (CN); Mikio Iwamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 327 days.

(21) Appl. No.: 12/856,502

(22) Filed: Aug. 13, 2010

(65) Prior Publication Data

US 2011/0039594 A1 Feb. 17, 2011

(30) Foreign Application Priority Data

Aug. 17, 2009 (CN) .......................... 2009 1 0165273

(51) Int. Cl.
*H04B 7/00* (2006.01)
*H04W 72/00* (2009.01)
*H04M 1/00* (2006.01)

(52) U.S. Cl. ...... 455/513; 455/515; 455/450; 455/552.1

(58) Field of Classification Search .................. 455/515, 455/450, 513, 552.1

See application file for complete search history.

(56) References Cited

U.S. PATENT DOCUMENTS

| | | | | |
|---|---|---|---|---|
| 8,027,687 | B2 * | 9/2011 | Jung et al. | 455/450 |
| 8,145,227 | B2 * | 3/2012 | Jung et al. | 455/450 |
| 2010/0240373 | A1 * | 9/2010 | Ji et al. | 455/436 |
| 2011/0170517 | A1 * | 7/2011 | Bakker et al. | 370/331 |
| 2011/0171924 | A1 * | 7/2011 | Faccin et al. | 455/404.1 |
| 2011/0171925 | A1 * | 7/2011 | Faccin et al. | 455/404.1 |
| 2011/0171926 | A1 * | 7/2011 | Faccin et al. | 455/404.1 |
| 2011/0171953 | A1 * | 7/2011 | Faccin et al. | 455/426.1 |
| 2011/0183676 | A1 * | 7/2011 | Lee et al. | 455/438 |
| 2011/0216732 | A1 * | 9/2011 | Maeda et al. | 370/329 |
| 2011/0261777 | A1 * | 10/2011 | Maeda et al. | 370/329 |
| 2012/0002637 | A1 * | 1/2012 | Adjakple et al. | 370/331 |
| 2012/0190363 | A1 * | 7/2012 | Maeda et al. | 455/435.1 |

* cited by examiner

*Primary Examiner* — Tilahun B Gesesse (74) *Attorney, Agent, or Firm* — Blakely, Sokoloff, Taylor & Zafman LLP (57) ABSTRACT

Methods of camping on a hybrid cell and checking access priority and devices therefor are provided. The service of a CSG user is preferably guaranteed by adjusting a UE's camping right and a passing probability of an access priority checking according to the user's contracted characteristic and limit access information of a hybrid cell Node B. At the same time, the initial access delay of a non-CSG user is reduced, the initial access efficiency of the non-CSG user is improved, and the network resource and the UE's power are saved.

13 Claims, 5 Drawing Sheets

METHOD OF CAMPING ON A HYBRID CELL AND CHECKING ACCESS PRIORITY AND DEVICE THEREFOR

The present application claims priority from Chinese Application Number 200910165273.0 filed Aug. 17, 2009, the disclosures of which are hereby incorporated by reference herein in their entirety.

BACKGROUND OF THE INVENTION

1. Field of the Invention

Embodiments of the present invention relates to a hybrid cell in a mobile communication system, and more particularly to a method of camping on a hybrid cell, a method of checking an access priority, a hybrid cell Node B and a user equipment (UE).

2. Description of the Prior Art

As an important organization in the mobile communication field, 3rd Generation Partnership Project (3GPP) has greatly promoted the standardization development of the Third Generation (3G) mobile communication technology and has instituted series of communication system specifications. In order to meet the challenge of the broadband access technology and the requirement of increasing new services, 3GPP initiated the standardization of the 3G Long Term Evolution (LTE) at the end of 2004, which aims to further improve the spectrum efficiency and the performance of the user at the cell border, reduce the system delay and provide high speed mobile users with higher rate access services. In order to avoid market splitting caused by non-standard solutions of different manufacturers and to guarantee the multi-vendor provision environment of Home Evolved Node B (HeNB), 3GPP initiates a studyitem (SI) "Study on Home NodeB/eNodeB" in the TSG-RAN#35 conference in March 2007, which aims to form a standard solution according to the typical application scenario of the HeNB. This SI is supported by three work groups RAN2, RAN3 and RAN4, which implement feasibility research in HeNB architecture, mobility, access control and radio frequency etc. With the development of 3G market and the expansion of user amount, the network operators propose requirements of how to provide high speed data service with low cost in the home environment and pay much attention to the new 3G product of HeNB.

Since HeNB is oriented to application scenarios such as home, small enterprises and the like, the HeNB may be owned by the user. Therefore, the HeNB system naturally needs to decide whether to provide service according to the user's identity, i.e. the HeNB system needs to have an admission control function. For example, a user make a contract with an operator to install a HeNB in his house and the user only wishes to provide services for family members and certain visitors. According to this requirement for the HeNB, 3GPP proposed the concept of Close Subscriber Group (CSG) to perform the admission control in Release 8 version. CSG refers to a group of contracted subscribers admitted to access one or more certain HeNB cells, wherein the subscribers are limited to access the one or more certain HeNB cells. The same UE may belong to multiple CSGs and each CSG is identified by one CSG identification (ID). The UE maintains a CSG ID list (admitted CSG ID list) of the CSGs it belongs to and the CSG cells corresponding to other CSG IDs outside this list are not admitted to access for this UE. Each CSG cell broadcasts the CSG ID of the cell and the members of the CSG identified by this CSG ID may be admitted to this cell.

In order to perform the admission control for the members in the CSG to access the CSG cell conveniently, the CSG cell needs to identify its access characteristic in the synchronization channel and broadcast information. In the defined Release 8 version, the specific definitions are as following.

—Physical Cell Identification Split (PCI split). Physical Cell Identification (PCI) is a sequence used for cell synchronization and is transmitted by the Node B in the downlink synchronization channel. Each cell has one PCI and when the user performs the cell search, he will first get the PCI and then is downlink synchronized with the cell according to the PCI. In order to make the user identify the CSG cell during the cell search, a part of PCIs, i.e. PCI split is specially split for the CSG cell in Release 8. The PCI split defines a range of PCIs, such as 0-50. If a cell is the CSG cell, the PCI within the range will be used; otherwise the PCI outside the range will be used.

—CSG Indicator. This indicator includes 1 bit information and is located in the System Information Block (SIB) 1 of the broadcast information, indicating whether a cell is a CSG cell. When the user reads this information and if its value is TRUE, it indicates that the cell is a CSG cell; otherwise, if the value is FALSE, it indicates the cell is a normal cell.

—CSG Identification (ID). In the discussion result of Release 8, this ID includes 27 bits and is also located in the SIB1, for uniquely identifying one CSG cell. As discussed above, when a user moves into the coverage of a CSG cell, after the synchronization processing and obtaining the CSG indicator, the present cell is identified as a CSG cell. Further, after comparing the CSG ID of the cell with the admitted CSG ID list (Whitelist) in its Subscriber Identification Module (SIM), it can be determined whether the user may access this CSG cell. Specifically, when the CSG ID of this cell is included in the Whitelist, the user may camp on or access this cell; otherwise, the user cannot camp on or access this cell.

The adoption of the HeNB may greatly improve the data transmission rate of home users and can improve the performance of the user at the cell border. However, the introduction of the HeNB may also bring other problems, such as the interference between the cellular cell and the HeNB and the unbalanced load between them. In order to solve these problems, 3GPP introduces a hybrid mode HeNB, i.e. the hybrid cell Node B in Release 9 version. The access right of the hybrid cell Node B is between those of the normal Node B and the CSG Node B. On one hand, it may provide the CSG user with the same performance service as that of the CSG cell; on the other hand, it may provide the non-CSG user with limited performance service in the case that the CSG user is not influenced. Because of the above characteristics, the hybrid cell has obtained a lot of attention. Currently, based on the above CSG cell access IDs, the access modes specific to the hybrid cell Node B are defined as following.

1) The PCI is selected outside the PCI split;
2) The CSG Indicator is given a value of False (such as 0 in binary);
3) The CSG ID includes 27 bit information, uniquely identifying the hybrid cell Node B.

When the UE obtains the above information in the synchronization channel and the broadcast information, the cell transmitting the information may be identified as a hybrid cell.

Although the hybrid cell Node B may solve some of interference problems and unbalanced load problems, its introduction also brings some new problems in the access procedure of the user.

Figure 1:
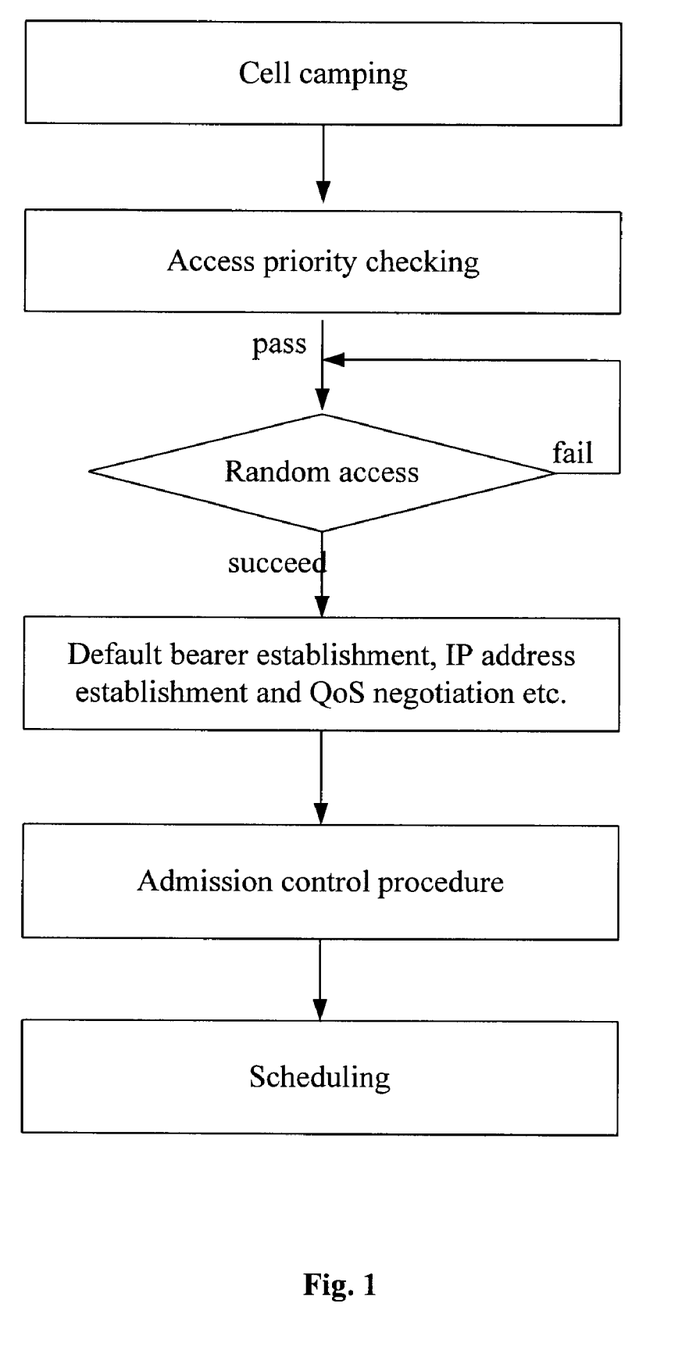
FIG. 1 is a flow chart showing a UE's initial access according to the prior art.

FIG. 1 shows an initial access procedure of UE according to the prior art. Before the UE camping on the cell initiates a random access, an access priority check should be performed for the UE; after the UE passed the access priority check, the UE accesses the cell by the random access procedure; after the random access is successful, the default bearer is established and the IP address, QoS and etc. are negotiated; then the admission control procedure and scheduling procedure are performed.

Currently, the hybrid cell Node B allows the non-CSG user to camp on the cell. When the non-CSG user initiates a random access, since the hybrid cell Node B prefers to provide services for CSG users, this access request may be refused during the admission control procedure or the non-CSG user already in an established communication connection may be switched to another cell because he influences the CSG user's service. The consequence is that when the status of the hybrid cell Node B is not suitable for accessing the non-CSG user, on one hand, the initial access delay of the non-CSG user will be increased and his established communication connection will be influenced; on the other hand, the consumption of the time and frequency resources and pilot sequence resources for random access will be increased and non-necessary resource consumption will be brought.

SUMMARY OF THE INVENTION

One embodiment of the invention provides a method of camping on a hybrid cell and a method of checking an access priority and devices therefor. Different processing is performed on a UE according to a user contract characteristic before a random access, which preferably guarantees a service of a CSG user and obviously reduces an initial access delay of a non-CSG user so that the access efficiency of the non-CSG user is improved.

In order to achieve the above, an embodiment of the invention provides the following solutions.

A method of checking an access priority of a hybrid cell, including:

in step A, at a UE, obtaining access limit information broadcasted by a hybrid cell Node B in one access priority checking, wherein the access limit information is set by the hybrid cell Node B according to a predefined access limit condition and is for indicating whether the hybrid cell limits access;

in step B, at the UE, determining whether the UE is a CSG user of the hybrid cell according to a pre-obtained CSG identification of the hybrid cell and a CSG cell list maintained by the UE, wherein the UE belongs to cells in the CSG cell list, and determining whether the hybrid cell Node B limits access according to the access limit information, wherein when the UE is the CSG user and the hybrid cell Node B does not limit access, the UE passes the one access priority check with a first probability;

when the UE is the CSG user and the hybrid cell Node B limits access, the UE passes the one access priority check with a second probability;

when the UE is not the CSG user and the hybrid cell Node B does not limit access, the UE passes the one access priority check with a third probability;

when the UE is not the CSG user and the hybrid cell Node B limits access, the UE passes the one access priority check with a fourth probability;

wherein the second probability and the third probability are both less than the first probability and larger than the fourth probability.

Preferably, according to the above access priority checking method, in step A, at the UE, further obtaining an access priority block parameter a broadcasted by the hybrid cell Node B, wherein $0 \leqq a \leqq 1$, and generating a random number b larger than or equivalent to 0 and less than or equivalent to 1;

in step B:

when the UE is the CSG user and the hybrid cell Node B does not limit access, the UE passes the one access priority check directly;

when the UE is the CSG user and the hybrid cell Node B limits access, the UE determines whether the UE can pass the one access priority check according to whether b is less than a;

when the UE is not the CSG user and the hybrid cell Node B does not limit access, the UE determines whether the UE can pass the one access priority check according to whether b is less than a;

when the UE is not the CSG user and the hybrid cell Node B limits access, the UE is refused to pass the one access priority check and the access priority checking is terminated, and the UE searches for another cell outside the hybrid cell and initiates a random access to the another cell.

Preferably, according to the above access priority checking method, if the UE does not pass the one access priority check, a next access priority check will be performed until the access priority check is passed or a number of performance of the access priority checking reaches a predefined upper limit.

Preferably, according to the above access priority checking method, the access limit information is carried in a self-defined bit in a system information block 2 broadcasted by the hybrid cell Node B.

The embodiment of the invention further provides a UE, which includes:

a parameter obtaining unit, configured to obtain access limit information of a hybrid cell Node B broadcasted by the hybrid cell Node B, wherein the access limit information is set by the hybrid cell Node B according to a predefined access limit condition and is for indicating whether the hybrid cell Node B limits access;

an access priority checking unit, configured to, in one access priority check, determine whether the hybrid cell Node B limits accessing according to the access limit information and determine whether the UE is a CSG user of the hybrid cell according to a pre-obtained CSG identification of the hybrid cell and a CSG cell list maintained by the UE, wherein the UE belongs to cells in the CSG cell list;

wherein the access priority checking unit determines that:

the UE passes the one access priority check with a first probability when the UE is the CSG user and the hybrid cell Node B does not limit access;

the UE passes the one access priority check with a second probability when the UE is the CSG user and the hybrid cell Node B limits access;

the UE passes the one access priority check with a third probability when the UE is not the CSG user and the hybrid cell Node B does not limit access;

the UE passes the one access priority check with a fourth probability when the UE is not the CSG user and the hybrid cell Node B limits access;

wherein the second probability and the third probability are both less than the first probability and larger than the fourth probability.

Preferably, according to the above UE, the parameter obtaining unit is further configured to obtain an access priority block parameter a broadcasted by the hybrid cell Node B, wherein $0 \leqq a \leqq 1$, and to generate a random number b larger than or equivalent to 0 and less than or equivalent to 1;

the access priority checking unit is further configured to determine that:

when the UE is the CSG user and the hybrid cell Node B does not limit access, the UE passes the one access priority check directly;

when the UE is the CSG user and the hybrid cell Node B limits access, whether the UE can pass the one access priority check according to whether b is less than a;

when the UE is not the CSG user and the hybrid cell Node B does not limit access, whether the UE can pass the one access priority check according to whether b is less than a;

when the UE is not the CSG user and the hybrid cell Node B limits access, the UE is refused to pass the one access priority check and the access priority checking is terminated, and the UE searches for another cell outside the hybrid cell and initiates a random access to the another cell.

The embodiment of the invention further provides a camping method in a hybrid cell, which includes:

at a user equipment (UE), receiving access limit information of a hybrid cell Node B and a CSG identification of the hybrid cell broadcasted by the hybrid cell Node B, wherein the access limit information is set by the hybrid cell Node B according to a predefined access limit condition and is for indicating whether the hybrid cell limits accessing;

at the UE, determining whether the UE is a CSG user of the hybrid cell according to the CSG identification of the hybrid cell and a CSG cell list maintained by the UE, wherein the UE belongs to cells in the CSG cell list;

if the UE is the CSG user of the hybrid cell, the UE camps on the hybrid cell;

if the UE is not the CSG user of the hybrid cell, the UE determines whether the hybrid cell Node B limits access according to the access limit information;

if the hybrid cell Node B limits access, the UE searches for another cell outside the hybrid cell to camp on;

if the hybrid cell Node B does not limit access, the UE camps on the hybrid cell.

Preferably, according to the above camping method, after determining that the hybrid cell Node B limits access according to the access limit information, if the UE has not searched the another cell outside the hybrid cell to camp on, the UE camps on the hybrid cell.

Preferably, according to the above camping method, the access limit information is carried in a CSG Indicator in a system information block 1 broadcasted by the hybrid cell Node B or carried in a self-defined bit in the system information block 1.

The embodiment of the invention further provides another UE, which includes:

a receiving unit, configured to receive access limit information of a hybrid cell Node B and a CSG identification of a hybrid cell broadcasted by the hybrid cell Node B, wherein the access limit information is set by the hybrid cell Node B according to a predefined access limit condition and is for indicating whether the hybrid cell limits access;

a camping processing unit, configured to determine whether the UE is a CSG user of the hybrid cell according to a pre-obtained CSG identification of the hybrid cell and a CSG cell list maintained by the UE, wherein the UE belongs to cells in the CSG cell list;

wherein the camping processing unit determines that:

the UE camps on the hybrid cell if the UE is the CSG user of the hybrid cell; or whether the hybrid cell Node B limits access according to the access limit information if the UE is not the CSG user of the hybrid cell;

wherein the UE searches for another cell outside the hybrid cell to camp on if the hybrid cell Node B limits access; or the UE camps on the hybrid cell if the hybrid cell Node B does not limit access.

Preferably, according to the above UE, after the camping processing unit determines that the hybrid cell Node B limits access according to the access limit information, if the UE has not searched the another cell outside the hybrid cell to camp on, the camping processing unit is further configured to determine that the UE camps on the hybrid cell.

The embodiment of the invention further provides a hybrid cell Node B, which includes:

an access limit information setting unit, configured to according to a predefined access limit condition, set access limit information indicating whether the hybrid cell Node B limits access;

broadcasting unit, configured to broadcast the access limit information and a CSG identification of a hybrid cell;

wherein the access limit information and the CSG identification of the hybrid cell are for a UE to determine whether the hybrid cell Node B limits access and to determine whether the UE is a CSG user of the hybrid cell, and when the UE is the CSG user, the UE camps on the hybrid cell; when the UE is not the CSG user and the hybrid cell Node B limits access, the UE searches for another cell outside the hybrid cell to camp on; when the UE is not the CSG user and the hybrid cell Node B does not limiting access, the UE camps on the hybrid cell.

Preferably, according to the above hybrid cell Node B, the broadcasting unit is further configured to carry the access limit information carried in a CSG Indicator in a system information block 1 or carry the access limit information in a self-defined bit in the system information block 1.

The above discussion shows that according to methods of camping on the hybrid cell and checking access priority and the devices therefor, the service of the CSG user is preferably guaranteed by adjusting UE's camping right and the passing probability of the access priority checking according to the user's contracted characteristic. In addition, according to the invention, when the hybrid cell Node B limits accessing, the non-CSG user's UE camps on another cell or switches to initiate a random access to another cell when the access priority check is performed on the hybrid cell Node B, which reduces the initial access delay of the non-CSG user, improves the initial access efficiency of the non-CSG user and saves the network resource and the UE's power.

DETAILED DESCRIPTION OF THE PREFERRED EMBODIMENTS

Two kinds of users may access the hybrid cell Node B: CSG users and non-CSG users. Different admission control strategies should be applied to the two kinds of users. The admission control strategies relate to procedures of camping, access priority checking, random access and admission control etc., wherein the camping right decides whether the user may camp on the hybrid cell, the access priority checking decides success probability of the user entering into the random access procedure from the camping status. According to the prior art, the CSG users and non-CSG users are only differentiated in the admission control phase and thus the non-CSG users may waste several times of access priority checking and random access delay and the non-CSG users already in established communication connection may be switched to another cell. In order to solve the problem, the present invention provides a more advanced and flexible camping method and access priority checking method for the hybrid cell Node B, which can better process the differentiated admission controls for the two kinds of users and reduce the access delay of the non-CSG users and the resource waste. The present invention will be further explained in the detailed description with reference to the accompanied drawings.

<Embodiment 1>

The embodiment provides a method of checking an access priority of a hybrid cell, which comprises the following steps.

In step 41, the UE obtains access limit information broadcasted by the hybrid cell Node B in one access priority check, wherein the access limit information is set by the hybrid cell Node B according to a predefined access limit condition and is for indicating whether the hybrid cell limits access.

Herein, the predefined access limit condition may be set according to the specific application environment and may for example include one or more of the following conditions.

1) Current load status of the hybrid cell Node B. For example, when the current load exceeds a predefined threshold, the hybrid cell Node B limits access; when the current load does not exceed the predefined threshold, the hybrid cell Node B does not limit accessing.

2) Uplink interference on the hybrid cell by the non-CSG user. For example, when the uplink interference exceeds a predefined value, the hybrid cell Node B does not limit access; otherwise, the hybrid cell Node B limits accessing so as to reduce the interference on the hybrid cell by the non-CSG user.

3) The operator or the owner of the hybrid cell Node B may set to require the hybrid cell Node B to limit accessing or not to limit access.

Herein, the hybrid cell Node B may make the access limit information carried in a self-defined bit (such as AcBarring flag) in SIB2 in the broadcast information. The access limit information is for indicating whether the hybrid cell Node B limits accessing and therefore only needs one bit. For example, when the hybrid cell Node B limits accessing, this bit is given the value of TRUE (such as 1 in binary); when the hybrid cell Node B does not limit access, this bit is given the value of FALSE (such as 0 in binary). The UE receives the broadcast information from the hybrid cell Node B and obtains the access limit information from the broadcast information.

In step 42, the UE determines whether the UE is a CSG user of the hybrid cell according to a pre-obtained CSG identification of the hybrid cell and a CSG cell list maintained by the UE, wherein the UE belongs to cells in the CSG cell list, and determines whether the hybrid cell Node B limits accessing according to the access limit information, wherein, the UE determines that:

the UE passes the one access priority check with a first probability when the UE is the CSG user and the hybrid cell Node B does not limit access;

the UE passes the one access priority check with a second probability when the UE is the CSG user and the hybrid cell Node B limits access;

the UE passes the one access priority check with a third probability when the UE is not the CSG user and the hybrid cell Node B does not limit access;

the UE passes the one access priority check with a fourth probability when the UE is not the CSG user and the hybrid cell Node B limits access;

wherein the second probability and the third probability are both less than the first probability and larger than the fourth probability.

Herein, if the UE does not pass the one access priority check, a next access priority check will be performed until the access priority check is passed or a number of access priority checks performed reaches a predefined upper limit.

In the above step, the specific procedure for the UE to pass the one access priority check with the first probability may be: the UE randomly generates a random number larger than or equivalent to 0 and less than or equivalent to 1 and then compares the random number with the first probability, and if the random number is less than the first probability, the UE passes the one access priority check; otherwise, the UE doesn't pass the one access priority check. Similarly, for the procedures for the UE to pass the one access priority check with the second, third or fourth probability, the UE may also determines whether a random number is less than the second, third or fourth probability and if yes, the UE passes the one access priority checking; otherwise, the UE doesn't pass the one access priority checking.

In the embodiment, according to whether the UE is the CSG user and according to whether the hybrid cell Node B limits accessing, the probability of passing the access priority checking is set, which guarantees that the CSG user may have a higher probability of passing the access priority check than the non-CSG user and the probability of passing the access priority checking for the same UE corresponds to whether the hybrid cell Node B limits access, wherein when the hybrid cell Node B limits accessing, the probability of passing the access priority check is reduced to reduce the processing pressure of the hybrid cell Node B.

Figure 5:
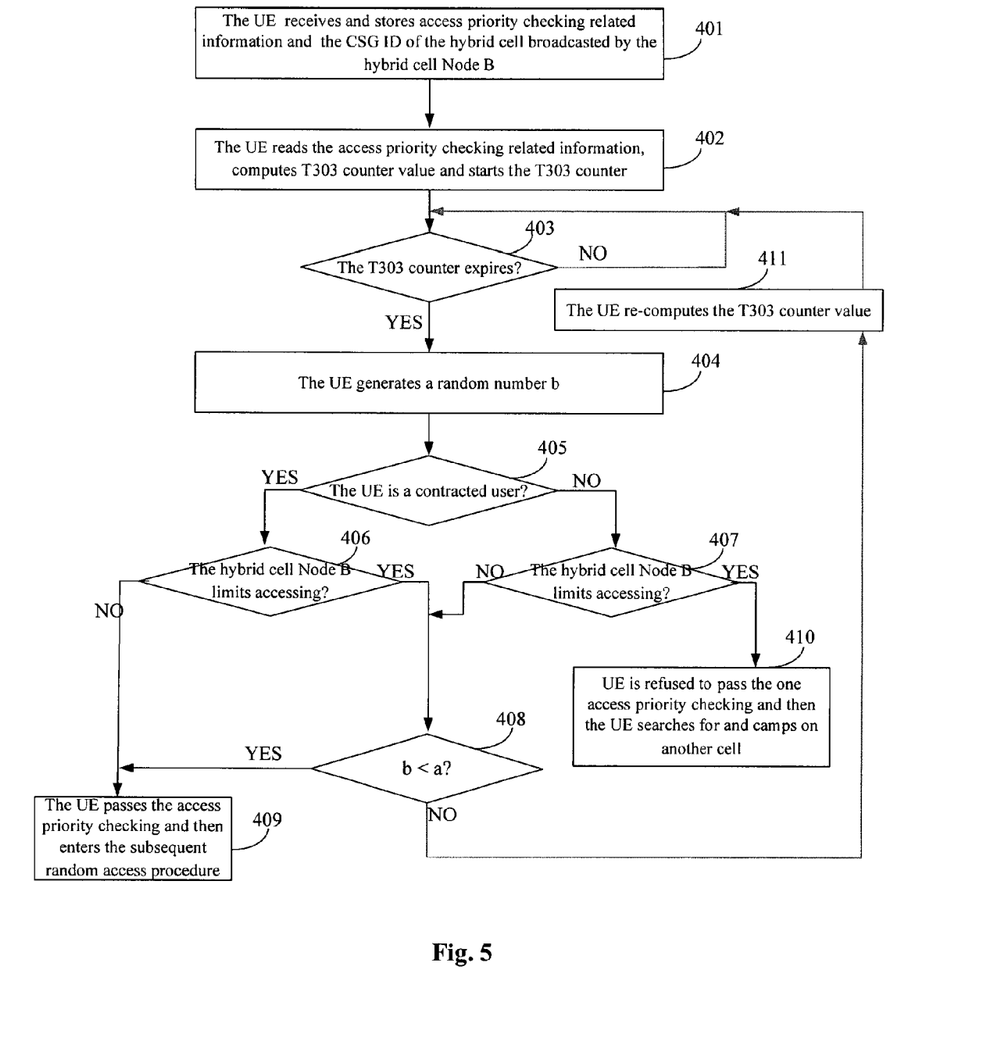
FIG. 5 is a flow chart showing a method of checking an access priority of a hybrid cell according to the embodiment of the present invention.

FIG. 5 further explains the above procedures of the embodiment by giving a more detailed solution.

In step 401, the UE camping on the hybrid cell receives and stores the CSG ID of the hybrid cell and access priority checking related information broadcasted by the hybrid cell Node B. The access priority checking related information is carried in the SIB2, including the access limit information of the hybrid cell Node B, AcBarringTime and access priority block parameter a etc. Herein, the UE continuously receives the above parameters broadcasted by the hybrid cell Node B and updates the corresponding values stored locally.

In step 402, before the UE initiates the random access, it performs the access priority checking. In one access priority checking, the UE reads the access priority checking related information stored in step 401, computes T303 counter value according to the AcBarringTime in the access priority checking related information and starts the T303 counter to degressively count from the T303 counter value.

In step 403, the UE determines whether the T303 counter expires, for example whether the counter value is 0 and if yes, the procedure goes to step 404; otherwise, the procedure returns to step 403 and continues to determine whether T303 counter expires. Herein, setting the T303 counter may avoid the UE from frequently initiating the random access.

In step 404, the UE generates a random number b within a range of [0, 1].

In Step 405, the UE determines whether the UE is a CSG user of the hybrid cell according to the CSG identification of the hybrid cell and a CSG cell list, wherein the UE belongs to cells in the CSG cell list, and if yes, the procedure goes to step 406; otherwise, the procedure goes to step 409.

In step 406, the UE determines whether the hybrid cell Node B limits accessing according to the access limit information of the hybrid cell Node B and if yes, the procedure goes to step 408; otherwise, the procedure goes to step 409.

In step 407, the UE determines whether the hybrid cell Node B limits accessing according to the access limit information of the hybrid cell Node B and if yes, the procedure goes to step 410; otherwise, the procedure goes to step 408.

In step 408, the UE compares the random number b and the access priority block parameter a and determines whether b is larger than a and if yes, the procedure goes to step 409; otherwise, the procedure goes to step 411.

Herein, since b is a random number generated by the UE within the range of [0, 1], the probability for b to be less than a is a and therefore the probability for the UE to pass the one access priority checking in step 408 is a.

In step 409, the UE passes the access priority checking and then enters the subsequent random access procedure.

In step 410, the UE is refused to pass the one access priority checking directly, i.e. the probability for the UE to pass the one access priority checking is 0 and the access priority checking procedure is terminated. Then the UE searches for another cell outside the hybrid cell which has a good SNR, camps on this another cell by cell reselection and initiates a random access in this another cell.

In step 411, the UE re-computes the T303 counter value according to the currently generated random number b and AcBarringTime and restarts the T303 counter and then the procedure returns to step 403.

In the above embodiment, the UE passes the one access priority checking directly when the UE is the CSG user and the hybrid cell Node B does not limit accessing; the UE determines whether the UE can pass the one access priority checking according to whether b is less than a when the UE is the CSG user and the hybrid cell Node B limits accessing; the UE determines whether the UE can pass the one access priority checking according to whether b is less than a when the UE is not the CSG user and the hybrid cell Node B does not limit accessing; the UE is refused to pass the one access priority checking and the access priority checking is terminated when the UE is not the CSG user and the hybrid cell Node B limits accessing, and the UE searches for another cell outside the hybrid cell and initiates a random access to the another cell.

The above discussion shows that according to this embodiment, the non-CSG user may camp on a hybrid cell Node B which limits accessing and only when the UE initiates the random access does it determines whether to select another Node B to be connected according to the access priority checking result. When the hybrid cell Node B limits accessing, the access priority checking of the hybrid cell Node B is terminated and the UE connects to another Node B directly. Compared with a case in which after the UE finally passes the access priority checking after many times of access priority checking, the UE is refused by the hybrid cell Node B in the subsequent admission control procedure and then accesses another Node B, the method of the embodiment reduces the access delay of the non-CSG user, improves the initial access efficiency of the non-CSG user and saves the network resource and the UE's power.

Figure 6:
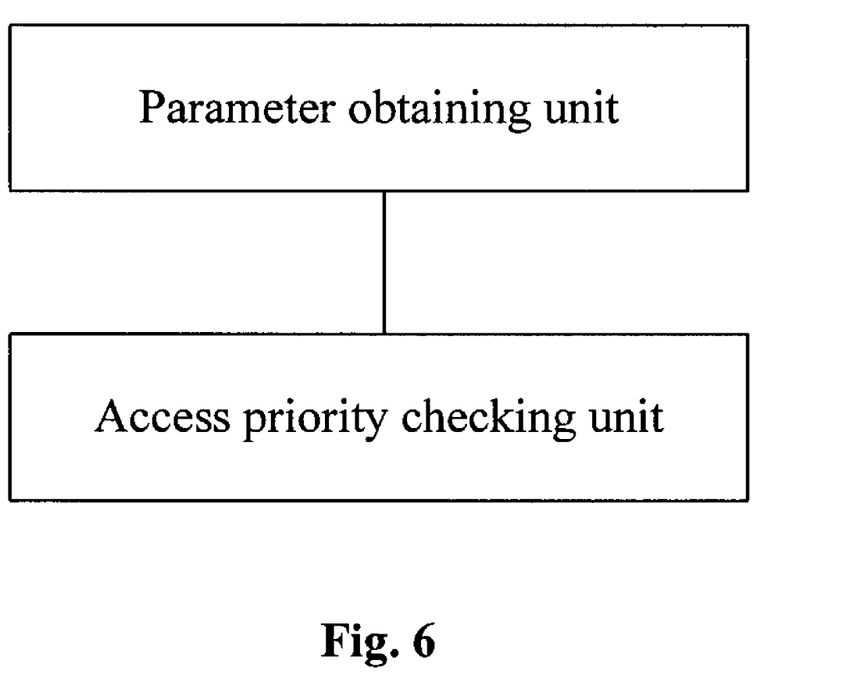
FIG. 6 is a schematic diagram showing a structure of a UE according to another embodiment of the present invention.

Based on the above access priority checking method, the embodiment further provides a UE for implementing the above access priority checking method. As shown in FIG. 6, the UE includes:

a parameter obtaining unit, configured to obtain access limit information of a hybrid cell Node B broadcasted by the hybrid cell Node B, wherein the access limit information is set by the hybrid cell Node B according to a predefined access limit condition and is for indicating whether the hybrid cell Node B limits accessing;

an access priority checking unit, configured to, in one access priority checking, determine whether the hybrid cell Node B limits accessing according to the access limit information, and determine whether the UE is a CSG user of the hybrid cell according to a pre-obtained CSG identification of the hybrid cell and a CSG cell list maintained by the UE, wherein the UE belongs to cells in the CSG cell list, and to determine whether the hybrid cell Node B limits accessing according to the access limit information;

wherein, the access priority checking unit determines that:

the UE passes the one access priority checking with a first probability when the UE is the CSG user and the hybrid cell Node B does not limit accessing;

the UE passes the one access priority checking with a second probability when the UE is the CSG user and the hybrid cell Node B limits accessing;

the UE passes the one access priority checking with a third probability when the UE is not the CSG user and the hybrid cell Node B does not limit accessing;

the UE passes the one access priority checking with a fourth probability when the UE is not the CSG user and the hybrid cell Node B limits accessing;

wherein the second probability and the third probability are both less than the first probability and larger than the fourth probability.

Preferably, in the above UE, the parameter obtaining unit is further configured to obtain an access priority block parameter a broadcasted by the hybrid cell Node B, wherein $0 \leq a \leq 1$, and to generate a random number b larger than or equivalent to 0 and less than or equivalent to 1.

The access priority checking unit is further configured to determine that:

the UE passes the one access priority checking directly when the UE is the CSG user and the hybrid cell Node B does not limit accessing;

whether the UE can pass the one access priority checking according to whether b is less than a when the UE is the CSG user and the hybrid cell Node B limits accessing;

whether the UE can pass the one access priority checking according to whether b is less than a when the UE is not the CSG user and the hybrid cell Node B does not limit accessing;

the UE is refused to pass the one access priority checking and the access priority checking is terminated when the UE is not the CSG user and the hybrid cell Node B limits accessing, and the UE searches for another cell outside the hybrid cell and initiates a random access to the another cell.

<Embodiment 2>

Figure 2:
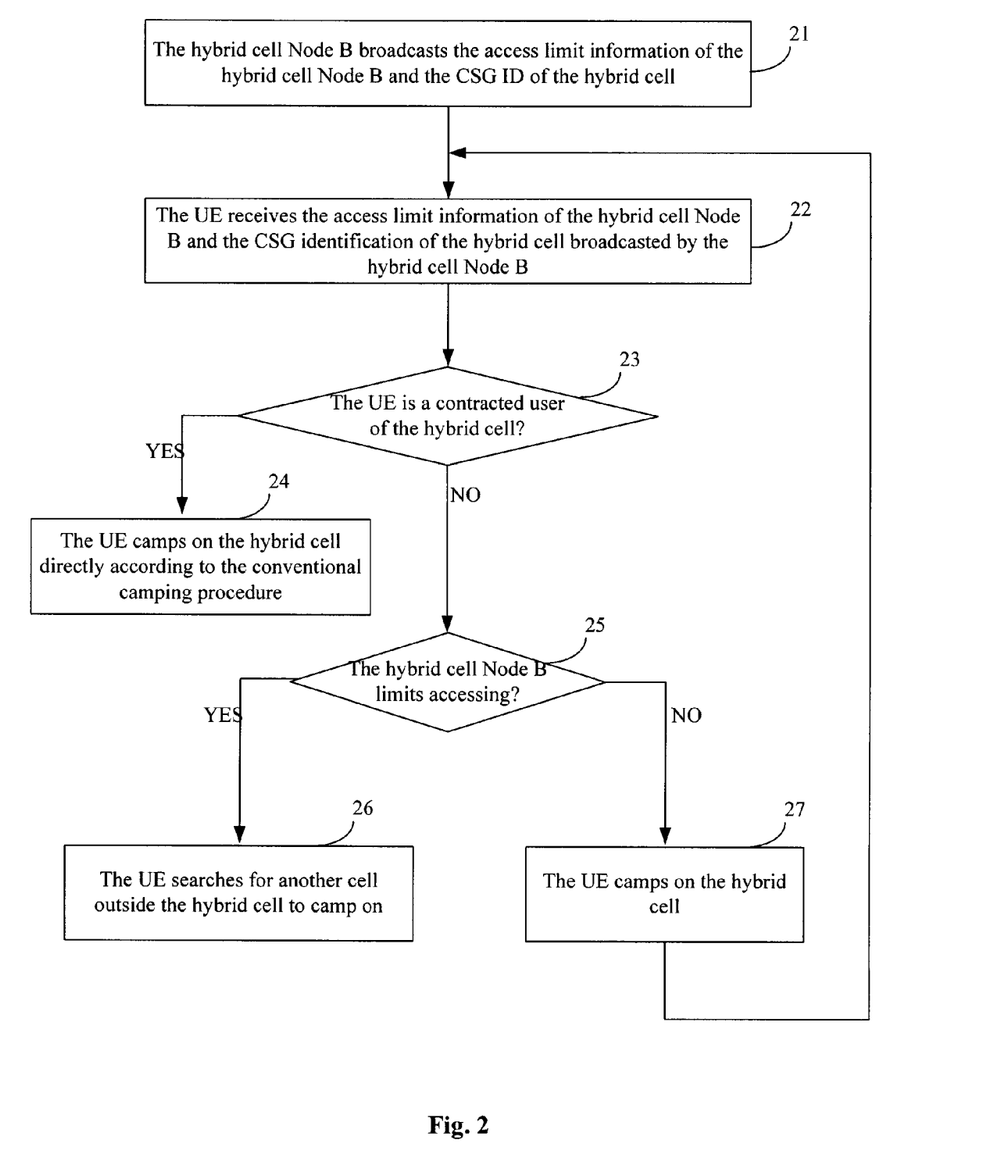
FIG. 2 is a flow chart showing a method of camping on a hybrid cell according to an embodiment of the present invention.

FIG. 2 shows a method of camping on a hybrid cell according to the embodiment and the method includes the following steps.

In step 21, the hybrid cell Node B sets the access limit information indicating whether the hybrid cell Node B limits access according to a predefined access limit condition and broadcasts the access limit information and the CSG ID of the hybrid cell.

Herein, the predefined access limit condition may be set according to the specific application environment and may for example include one or more of the following conditions.

1) Current load status of the hybrid cell Node B. For example, when the current load exceeds a predefined threshold, the hybrid cell Node B limits accessing; when the current load does not exceed the predefined threshold, the hybrid cell Node B does not limit access.

2) Uplink interference on the hybrid cell by the non-CSG user. For example, when the uplink interference exceeds a predefined value, the hybrid cell Node B does not limit access; otherwise, the hybrid cell Node B limits accessing so as to reduce the interference on the hybrid cell by the non-CSG user.

3) The operator or the owner of the hybrid cell Node B may set to require the hybrid cell Node B to limit accessing or not to limit access.

Herein, the hybrid cell Node B may make the access limit information carried in the CSG Indicator in SIB1 or a self-defined bit (such as AcBarring flag) in SIB1 in the broadcast information. The access limit information is for indicating whether the hybrid cell Node B limits access and therefore only needs one bit. For example, when the hybrid cell Node B limits access, this bit is given the value of TRUE (such as 1 in binary); when the hybrid cell Node B does not limit access, this bit is given the value of FALSE (such as 0 in binary).

In step 22, the UE receives the access limit information of the hybrid cell Node B and the CSG identification of the hybrid cell broadcasted by the hybrid cell Node B.

Herein, the UE may be in a silent status and move to the coverage of the hybrid cell so that the UE reselects a cell and camps on the cell. The UE may be originally in the coverage of the hybrid cell and camp on the cell through a camping procedure. When the UE camps on the cell, it needs to receive and read the SIB1 information broadcasted in the cell.

In step 23, the UE determines whether the UE is a CSG user of the hybrid cell according to the CSG identification of the hybrid cell and a CSG cell list maintained by the UE, wherein the UE belongs to cells in the CSG cell list and if yes, the procedure goes to step 24; otherwise the procedure goes to step 25.

Herein, the UE may store the list of the CSG cells to which the UE belongs in its own SIM card and if the list of the CSG cells to which the UE belongs includes the CSG ID of the hybrid cell, the UE determines that it is the CSG user of the hybrid cell; otherwise the UE determines that it is not the CSG user of the hybrid cell (i.e. the UE determines that it is the non-CSG user of the hybrid cell).

In step 24, the UE camps on the hybrid cell directly according to a conventional camping procedure.

In step 25, the UE determines whether the hybrid cell Node B limits access according to the access limit information and if yes, the procedure goes to step 26; otherwise the procedure goes to step 27.

In step 26, the UE searches for another cell outside the hybrid cell to camp on.

In step 27, the UE camps on the hybrid cell and the procedure returns to step 21 to repeat the above procedure so that the non-CSG user may select a cell to camp on according to the change of the access limit information of the hybrid cell.

Herein, in step 25, after the UE determines that the hybrid cell Node B limits accessing according to the access limit information, if the UE has not searched the another cell outside the hybrid cell to camp on, the UE may camp on the hybrid cell and then the procedure returns to step 21.

In the method of camping on the hybrid cell according to the embodiment, when the UE wants to camp on the hybrid cell, it determines whether itself is the CSG user by reading the SIB1 information broadcasted in the cell and if yes, the UE camps on the hybrid cell directly; otherwise, the UE needs to determine whether to search for another cell to camp on according to the access limit information of the hybrid cell Node B. According to the embodiment, for the cell camping of the non-CSG user, the access limit of the hybrid cell Node B is also taken into account. When the hybrid cell limits access, the cell camping of the non-CSG user is reduced so as to save more resources for the CSG user so that the CSG user may obtain the preferable usage of the hybrid cell Node B he supposed to get. At the same time, according to the embodiment, when the hybrid cell Node B limits access (such as when the hybrid cell Node B is in a high load status), the non-CSG user is refused to camp on the hybrid cell so that he is prompted to search for another cell to camp on. According to the embodiment, the waste of time and frequency resource and pilot sequence resource caused by the subsequent random access initiated by the non-CSG user is avoided and the initial access delay of the non-CSG user is reduced. Why the initial access delay of the non-CSG user is increased and why the non-CSG user may cause resource waste is that if the non-CSG user camps on the hybrid cell Node B which limits accessing and if the non-CSG user initiates a subsequent random access request, the request may be refused during the admission control procedure, which makes the non-CSG user continuously repeat the random access.

Based on the above camping method, the embodiment further provides a corresponding UE and a hybrid cell Node B.

Figure 3:
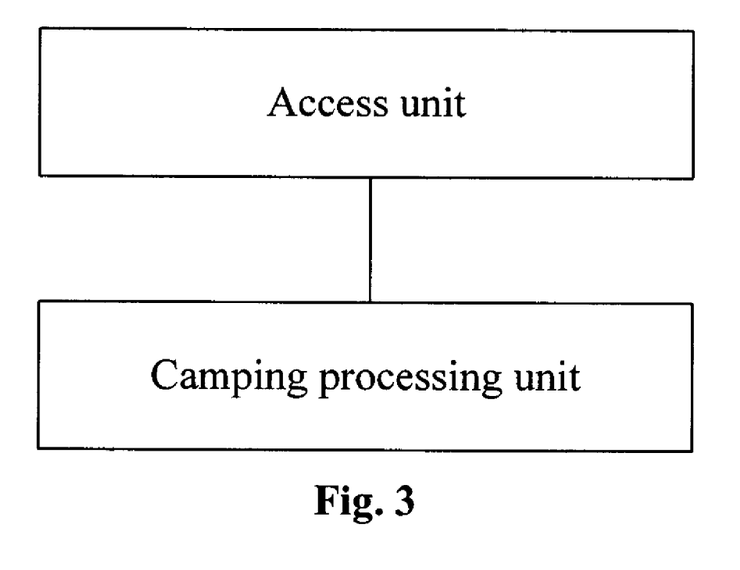
FIG. 3 is a schematic diagram showing a structure of a UE according to the embodiment of the present invention.

As shown in FIG. 3, the UE according to the embodiment includes:

a receiving unit, configured to receive access limit information of a hybrid cell Node B and a CSG identification of the hybrid cell broadcasted by the hybrid cell Node B, wherein the access limit information is set by the hybrid cell Node B according to a predefined access limit condition and is for indicating whether the hybrid cell limits access;

a camping processing unit, configured to determine whether the UE is a CSG user of the hybrid cell according to the CSG identification of the hybrid cell and a CSG cell list maintained by the UE, wherein the UE belongs to cells in the CSG cell list;

wherein the camping processing unit determines that:

the UE camps on the hybrid cell if the UE is the CSG user of the hybrid cell; or whether the hybrid cell Node B limits accessing according to the access limit information if the UE is not the CSG user of the hybrid cell;

the UE searches for another cell outside the hybrid cell to camp on if the hybrid cell Node B limits access; or the UE camps on the hybrid cell if the hybrid cell Node B does not limit accessing.

Herein, preferably, after the camping processing unit determines that the hybrid cell Node B limits access according to the access limit information, if the UE has not searched the another cell outside the hybrid cell to camp on, the camping processing unit is further configured to determine that the UE camps on the hybrid cell.

Figure 4:
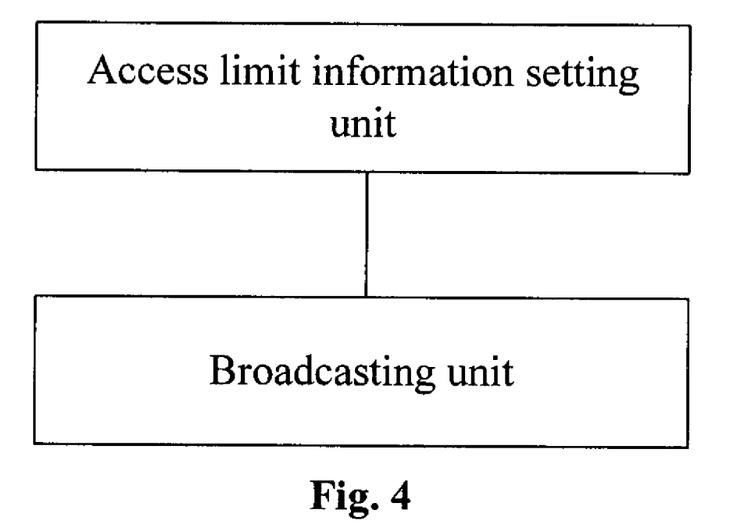
FIG. 4 is a schematic diagram showing a structure of a hybrid cell Node B according to the embodiment of the present invention.

As shown in FIG. 4, the hybrid cell Node B according to the embodiment includes:

an access limit information setting unit, configured to set access limit information indicating whether the hybrid cell Node B limits access according to a predefined access limit condition;

broadcasting unit, configured to broadcast the access limit information and a CSG identification of the hybrid cell;

wherein the access limit information and the CSG identification of the hybrid cell are for a UE to determine whether the hybrid cell Node B limits access and to determine whether the UE is a CSG user of the hybrid cell, and when the UE is the CSG user, the UE camps on the hybrid cell; when the UE is not the CSG user and the hybrid cell Node B limits access, the UE searches for another cell outside the hybrid cell to camp on; and when the UE is not the CSG user and the hybrid cell Node B does not limiting access, the UE camps on the hybrid cell.

Preferably, the broadcasting unit is further configured to carry the access limit information in a CSG Indicator in the SIB1 or to carry the access limit information in a self-defined bit in the SIB1.

Briefly, according to the method of camping on the hybrid cell and the method of checking access priority, the UE and the hybrid cell Node B provided by the embodiments, the camping right and the access strategy of the access priority checking are adjusted adaptively according to the user contract characteristic so that meaningless attempts by the non-CSG user is avoided and the initial access delay of the non-CSG user is reduced and therefore the network resource is saved.

What is claimed is:

1. A method of checking access priority of a hybrid cell, comprising:
   in step A, at a user equipment (UE), obtaining access limit information broadcasted by a hybrid cell Node B in one access priority check, wherein the access limit information is set by the hybrid cell Node B according to a predefined access limit condition and is for indicating whether the hybrid cell limits access;
   in step B, at the UE, determining whether the UE is a Close Subscriber Group (CSG) user of the hybrid cell according to a pre-obtained CSG identification of the hybrid cell and a CSG cell list maintained by the UE, wherein the UE belongs to cells in the CSG cell list, and determining whether the hybrid cell Node B limits access according to the access limit information, wherein
   when the UE is the CSG user and the hybrid cell Node B does not limit access, the UE passes the one access priority check with a first probability;
   when the UE is the CSG user and the hybrid cell Node B limits access, the UE passes the one access priority check with a second probability;
   when the UE is not the CSG user and the hybrid cell Node B does not limit access, the UE passes the one access priority check with a third probability;
   when the UE is not the CSG user and the hybrid cell Node B limits access, the UE passes the one access priority check with a fourth probability;
   wherein the second probability and the third probability are both less than the first probability and larger than the fourth probability.

2. The method according to claim 1, wherein,
   in step A, at the UE, further obtaining an access priority block parameter a broadcasted by the hybrid cell Node B, wherein $0 \leq a \leq 1$, and generating a random number b larger than or equivalent to 0 and less than or equivalent to 1;
   in step B:
   when the UE is the CSG user and the hybrid cell Node B does not limit access, the UE passes the one access priority check directly;
   when the UE is the CSG user and the hybrid cell Node B limits access, the UE determines whether the UE can pass the one access priority check according to whether b is less than a;
   when the UE is not the CSG user and the hybrid cell Node B does not limit access, the UE determines whether the UE can pass the one access priority check according to whether b is less than a;
   when the UE is not the CSG user and the hybrid cell Node B limits access, the UE is refused to pass the one access priority check and the access priority checking is terminated, and the UE searches for another cell outside the hybrid cell and initiates a random access to the another cell.

3. The method according to claim 1, wherein if the UE does not pass the one access priority check, a next access priority check will be performed until the access priority checking is passed or a number of performing the access priority check reaches a predefined upper limit.

4. The method according to claim 1, wherein the access limit information is carried in a self-defined bit in a system information block 2 broadcasted by the hybrid cell Node B.

5. A user equipment (UE), comprising:
   a parameter obtaining unit to obtain access limit information of a hybrid cell Node B broadcasted by the hybrid cell Node B, wherein the access limit information is set by the hybrid cell Node B according to a predefined access limit condition and is for indicating whether the hybrid cell Node B limits access;
   an access priority checking unit to, in one access priority check, determine whether the hybrid cell Node B limits access according to the access limit information and determine whether the UE is a Close Subscriber Group (CSG) user of the hybrid cell according to a pre-obtained CSG identification of the hybrid cell and a CSG cell list maintained by the UE, wherein the UE belongs to cells in the CSG cell list;
   wherein the access priority checking unit determines that:
   the UE passes the one access priority check with a first probability when the UE is the CSG user and the hybrid cell Node B does not limit access;
   the UE passes the one access priority check with a second probability when the UE is the CSG user and the hybrid cell Node B limits access;
   the UE passes the one access priority check with a third probability when the UE is not the CSG user and the hybrid cell Node B does not limit access;
   the UE passes the one access priority check with a fourth probability when the UE is not the CSG user and the hybrid cell Node B limits access;
   wherein the second probability and the third probability are both less than the first probability and larger than the fourth probability.

6. The UE according to claim 5, wherein,
   the parameter obtaining unit is further operable to obtain an access priority block parameter a broadcasted by the hybrid cell Node B, wherein $0 \leq a \leq 1$, and to generate a random number b larger than or equivalent to 0 and less than or equivalent to 1;
   the access priority checking unit is further operable to determine that:
   when the UE is the CSG user and the hybrid cell Node B does not limit access, the UE passes the one access priority check directly;
   when the UE is the CSG user and the hybrid cell Node B limits access, whether the UE can pass the one access priority check according to whether b is less than a;

when the UE is not the CSG user and the hybrid cell Node B does not limit access, whether the UE can pass the one access priority check according to whether b is less than a;

when the UE is not the CSG user and the hybrid cell Node B limits access, the UE is refused to pass the one access priority check and the access priority checking is terminated, and the UE searches for another cell outside the hybrid cell and initiates a random access to the another cell.

7. A method of camping on a hybrid cell, comprising:

at a user equipment (UE), receiving access limit information of a hybrid cell Node B and a Close Subscriber Group (CSG) identification of the hybrid cell broadcasted by the hybrid cell Node B, wherein the access limit information is set by the hybrid cell Node B according to a predefined access limit condition and is for indicating whether the hybrid cell limits access;

at the UE, determining whether the UE is a CSG user of the hybrid cell according to the CSG identification of the hybrid cell and a CSG cell list maintained by the UE, wherein the UE belongs to cells in the CSG cell list;

if the UE is the CSG user of the hybrid cell, the UE camps on the hybrid cell;

if the UE is not the CSG user of the hybrid cell, the UE determines whether the hybrid cell Node B limits access according to the access limit information;

if the hybrid cell Node B limits access, the UE searches for another cell outside the hybrid cell to camp on;

if the hybrid cell Node B does not limit access, the UE camps on the hybrid cell.

8. The method according to claim 7, wherein after determining that the hybrid cell Node B limits access according to the access limit information, if the UE has not searched the another cell outside the hybrid cell to camp on, the UE camps on the hybrid cell.

9. The method according to claim 7 or 8, wherein the access limit information is carried in a CSG Indicator in a system information block 1 broadcasted by the hybrid cell Node B or carried in a self-defined bit in the system information block 1.

10. A user equipment (UE), comprising:

a receiving unit, configured to receive access limit information of a hybrid cell Node B and a Close Subscriber Group (CSG) identification of a hybrid cell broadcasted by the hybrid cell Node B, wherein the access limit information is set by the hybrid cell Node B according to a predefined access limit condition and is for indicating whether the hybrid cell limits access;

a camping processing unit to determine whether the UE is a CSG user of the hybrid cell according to a pre-obtained CSG identification of the hybrid cell and a CSG cell list maintained by the UE, wherein the UE belongs to cells in the CSG cell list;

wherein the camping processing unit determines that:

the UE camps on the hybrid cell if the UE is the CSG user of the hybrid cell; or whether the hybrid cell Node B limits access according to the access limit information if the UE is not the CSG user of the hybrid cell;

wherein the UE searches for another cell outside the hybrid cell to camp on if the hybrid cell Node B limits access; or the UE camps on the hybrid cell if the hybrid cell Node B does not limit access.

11. The UE according to claim 10, wherein, after the camping processing unit determines that the hybrid cell Node B limits access according to the access limit information, if the UE has not searched the another cell outside the hybrid cell to camp on, the camping processing unit is further operable to determine that the UE camps on the hybrid cell.

12. A hybrid cell Node B, comprising:

an access limit information setting unit to according to a predefined access limit condition, set access limit information indicating whether the hybrid cell Node B limits access;

broadcasting unit to broadcast the access limit information and a Close Subscriber Group (CSG) identification of a hybrid cell;

wherein the access limit information and the CSG identification of the hybrid cell are for a UE to determine whether the hybrid cell Node B limits access and to determine whether the UE is a CSG user of the hybrid cell, and when the UE is the CSG user, the UE camps on the hybrid cell; when the UE is not the CSG user and the hybrid cell Node B limits access, the UE searches for another cell outside the hybrid cell to camp on; when the UE is not the CSG user and the hybrid cell Node B does not limiting access, the UE camps on the hybrid cell.

13. The hybrid cell Node B according to claim 12, wherein, the broadcasting unit is further operable to carry the access limit information carried in a CSG Indicator in a system information block 1 or carry the access limit information in a self-defined bit in the system information block 1.

* * * * *